US 11,740,646 B2

(12) United States Patent
Steffes et al.

(10) Patent No.: US 11,740,646 B2
(45) Date of Patent: *Aug. 29, 2023

(54) FLOW-BASED ENERGY MANAGEMENT

(71) Applicant: Steffes Corporation, Dickinson, ND (US)

(72) Inventors: Thomas P. Steffes, Dickinson, ND (US); Austin P. Zeller, Dickinson, ND (US); Joshua P. Vetter, Dickinson, ND (US); Todd C. Mayer, Dickinson, ND (US); Paul J. Steffes, Dickinson, ND (US)

(73) Assignee: Steffes, LLC, Dickinson, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,765

(22) Filed: Nov. 29, 2021

(65) Prior Publication Data
US 2022/0083088 A1 Mar. 17, 2022

Related U.S. Application Data

(63) Continuation of application No. 16/358,292, filed on Mar. 19, 2019, now Pat. No. 11,209,852.
(Continued)

(51) Int. Cl.
G05B 15/02 (2006.01)
G05F 1/66 (2006.01)
(Continued)

(52) U.S. Cl.
CPC ............ G05F 1/66 (2013.01); G05B 15/02 (2013.01); H02J 3/28 (2013.01); H02J 13/00009 (2020.01); H02J 15/00 (2013.01)

(58) Field of Classification Search
CPC .... G05F 1/66; G05B 15/02; H02J 3/28; H02J 13/00009; H02J 15/00; Y02E 60/00; Y02E 60/7815; Y04S 40/121
See application file for complete search history.

(56) References Cited

U.S. PATENT DOCUMENTS 4,332,507 A 6/1982 Wakamori et al.
5,701,554 A * 12/1997 Tanaka ............... G03G 15/2039
399/69
(Continued)

FOREIGN PATENT DOCUMENTS

JP 2008205126 A * 9/2008 ........... F01N 13/009
KR 20120065509 A * 6/2012 ............... F23N 5/02

OTHER PUBLICATIONS

Prosecution history from U.S. Appl. No. 16/358,292, filed Mar. 19, 2019 including: Notice of Allowance and Fee(s) Due dated Aug. 19, 2021; Advisory Action dated Jul. 26, 2021; Final Rejection dated Jun. 14, 2021; Non-Final Rejection dated Jan. 28, 2021; Advisory Action dated Sep. 21, 2020; Final Rejection dated Jun. 22, 2020; and Non-Final Rejection dated Apr. 22, 2020.
(Continued)

Primary Examiner — Santosh R Poudel
(74) Attorney, Agent, or Firm — Brian D. Kaul; Westman, Champlin & Koehler, P.A.

(57) ABSTRACT

An energy management system includes an energy input sensor, an energy output sensor and a system controller. The energy input sensor is configured to generate at least one energy input signal indicating an energy flow to an energy storage medium of an energy storage device. The energy output sensor is configured to generate at least one energy output signal indicating an energy flow from the energy storage medium. The system controller is configured to estimate a charge level of the energy storage medium based on an initial charge level of the energy storage medium and a change in the charge level of the energy storage medium, which is based on the at least one energy input signal and the at least one energy output signal.

19 Claims, 1 Drawing Sheet

Related U.S. Application Data

(60) Provisional application No. 62/645,337, filed on Mar. 20, 2018.

(51) Int. Cl.
*H02J 3/28* (2006.01)
*H02J 13/00* (2006.01)
*H02J 15/00* (2006.01)

(56) References Cited

U.S. PATENT DOCUMENTS

| | | | |
|---|---|---|---|
| 5,719,778 A * | 2/1998 | Suzumura | G01N 27/4067 700/207 |
| 8,010,240 B2 | 8/2011 | Mattiocco et al. | |
| 8,121,742 B2 | 2/2012 | Flohr et al. | |
| 8,805,597 B2 | 8/2014 | Steffes et al. | |
| 10,186,879 B2 | 1/2019 | Steffes et al. | |
| 2004/0204870 A1 | 10/2004 | Schimnowski et al. | |
| 2010/0212656 A1 | 8/2010 | Qiu et al. | |
| 2014/0020383 A1* | 1/2014 | Yoshida | F03G 6/005 60/645 |
| 2014/0161430 A1 | 6/2014 | Roetker et al. | |
| 2014/0209043 A1* | 7/2014 | Hardesty | F24H 9/133 220/694.1 |
| 2015/0063793 A1 | 3/2015 | Zeller et al. | |
| 2015/0122745 A1* | 5/2015 | Stickney | F24D 19/1051 210/138 |
| 2016/0121712 A1 | 5/2016 | Ogiwara et al. | |
| 2016/0344204 A1 | 11/2016 | Steffes et al. | |
| 2018/0342774 A1 | 11/2018 | Shimada | |
| 2019/0024908 A1 | 1/2019 | Chaudhry et al. | |
| 2019/0170026 A1 | 6/2019 | Matsukuma et al. | |

OTHER PUBLICATIONS

"Introduction to Integration, 2021, Math is Fun, pp. 3-6, https://www.mathisfun.com/calculus/integration-introduction.html" (Year: 2021).

* cited by examiner

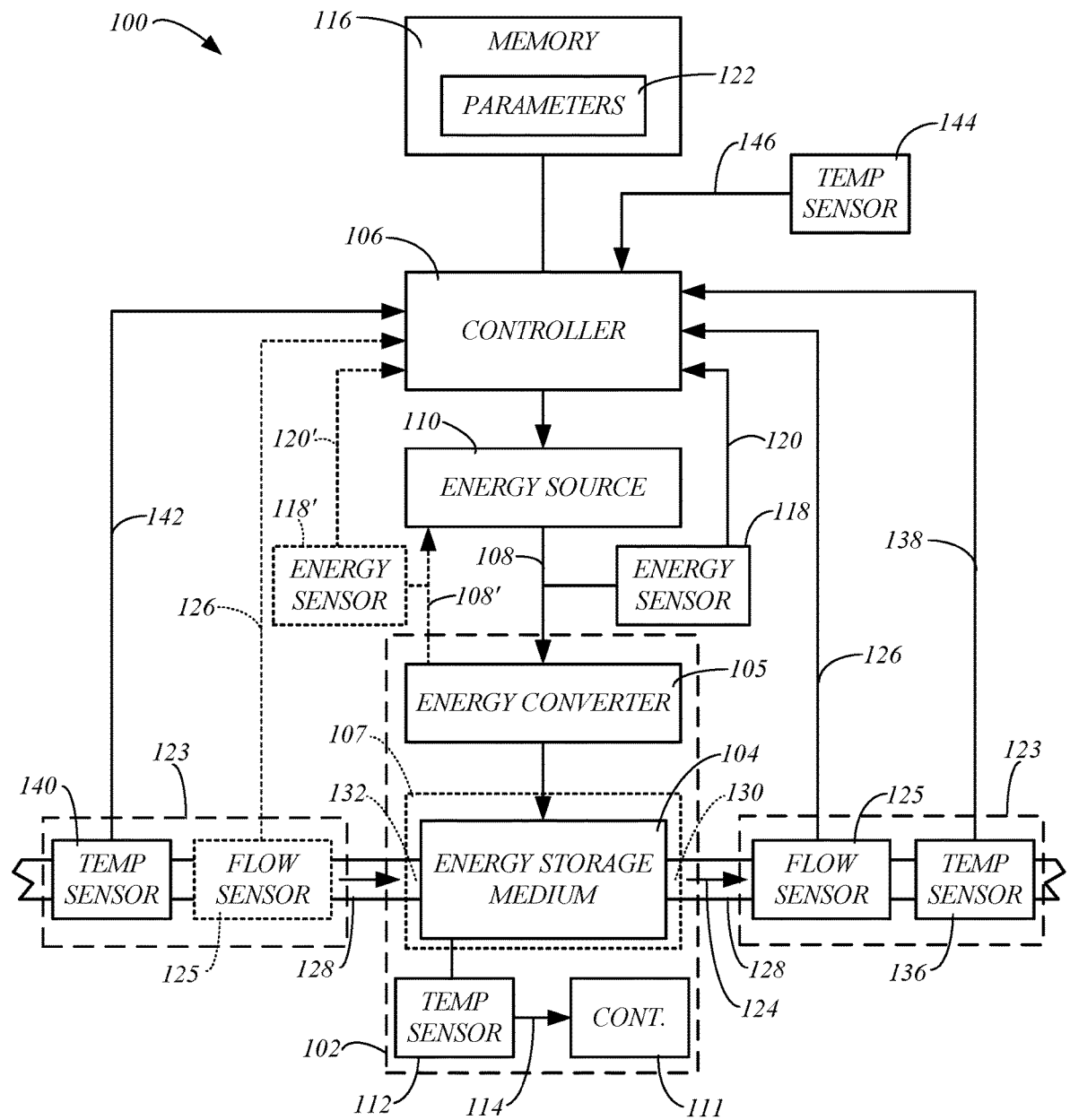

FLOW-BASED ENERGY MANAGEMENT

CROSS-REFERENCE TO RELATED APPLICATION

The present application is a continuation of Ser. No. 16/358,292, filed Mar. 19, 2019, which is based on and claims the benefit of U.S. provisional patent application Ser. No. 62/645,337, filed Mar. 20, 2018, the content of which is hereby incorporated by reference in its entirety.

FIELD

Embodiments of the present disclosure are directed to systems and methods for managing energy consumption of an energy storage device including estimating a charge level or a remaining energy capacity of an energy storage medium of the device.

BACKGROUND

For some electrical power distribution systems, balancing power generation with energy demands (i.e., load) can be challenging, particularly when the electrical power distribution systems are connected to electrical power generating systems having a variable power output, such as wind power generators and solar power generators. For instance, wind power generators generate electrical energy outputs that vary widely depending on the wind speeds. Additionally, the power generated by such systems cannot be easily controlled by adding or removing wind turbines responsive to the energy load on the system.

As a result, variable output power generators often generate electrical energy that exceeds the demand on the electrical power distribution systems, such as during high wind conditions at off-peak power demand times. Such excess energy may be wasted if the load on the electrical power distribution system is not adjusted.

For many years electrical power distribution systems have controlled energy consuming devices through a communication that turns the devices on or off. Typically, this control is used to reduce the power demand on electrical power distribution system peak power consumption periods, as described in U.S. Pat. No. 8,010,240. U.S. Pat. No. 8,121,742 discloses an energy distribution system that controls the activation and deactivation of a group of water heaters for the purpose of controlling the load on the grid. This activation and deactivation of groups of electrical devices by the electrical power distribution system is conducted without actual knowledge of how it may affect the energy demands placed on the electrical power distribution system. Accordingly, control of the actual energy demand using these techniques is limited.

U.S. Pat. No. 8,805,597, which issued to Steffes Corporation, discloses a technique for controlling a rate of energy consumption by electrical appliances responsive to a signal from the electrical power distribution system. This allows the electrical power distribution system to adjust the energy consumption of electrical appliances to meet its needs, while storing energy that may otherwise be wasted for later use, such as in a heat storage medium, for example.

The remaining energy storage capacity of an energy storage device, such as a water heater, relates to the amount of energy storage the device has remaining from its current state. Thus, the remaining energy storage capacity can be determined by subtracting a current energy storage level or charge from the maximum amount of heat energy that may be stored.

The remaining energy storage capacity of an energy storage device may be useful in determining an energy load that may be provided by the energy storage device to consume available power, such as from a variable electrical energy power generator. Thus, the remaining energy storage capacity may be useful, for example, in notifying an electrical power distribution system of the electrical load that may be available to assist the system in balancing power generation with energy demands, such as described in U.S. Pat. No. 10,186,879, which issued to Steffes Corporation.

SUMMARY

Embodiments of the present disclosure are directed to energy management systems and methods for estimating a charge level of an energy storage medium of an energy storage device. In addition to the energy storage medium, the energy storage device includes an energy converter configured to add energy to the medium, a device temperature sensor configured to detect a temperature of the energy storage medium, and a device controller configured to control the energy converter based on a temperature signal from the device temperature sensor.

One embodiment of the system includes an energy input sensor, an energy output sensor and a system controller. The energy input sensor is configured to generate at least one energy input signal indicating an energy flow to the energy storage medium. The energy output sensor is configured to generate at least one energy output signal indicating an energy flow from the energy storage medium. The system controller is configured to estimate a charge level of the energy storage medium based on an initial charge level of the energy storage medium and a change in the charge level of the energy storage medium, which is based on the at least one energy input signal and the at least one energy output signal.

In one embodiment of the method, at least one energy input signal is generated using an energy input sensor indicating heat energy input to the energy storage medium from the energy converter. At least one energy output signal is generated using an energy output sensor indicating heat energy output from the energy storage medium. A charge level of the energy storage medium is estimated based on an initial charge level of the energy storage medium and a change in the charge level of the energy storage medium, which is based on the at least one energy input signal and the at least one energy output signal, using a system controller.

In another embodiment of the system, the energy storage device is in the form of a water heater and the energy storage medium is in the form of water contained within a tank. The system includes an energy input sensor, an energy output sensor and a system controller. The energy input sensor is configured to detect electrical power delivered to the energy converter or an exchange of heat energy between a fluid flow and the energy converter, and generate at least one energy input signal indicating heat energy input to the energy storage medium from the energy converter. The energy input sensor includes an electrical power sensor including an electrical circuit configured to detect the electrical power, or a heat flow sensor including a flow sensor configured to measure a flow rate of the fluid flow, and/or a temperature sensor configured to measure a temperature of the fluid flow. The energy output sensor is configured to generate at least one energy output signal indicating energy flow from the device, the energy output sensor including a first flow rate sensor configured to generate a first flow rate signal indicating a flow rate of the water delivered to or discharged from the tank. The at least one energy output signal includes the first flow rate signal. The system controller is configured to estimate a charge level of the water contained in the tank based on an initial charge level of the water and a change in the charge level of the water, which is based on the at least one energy input signal and the at least one energy output signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 1 is a simplified block diagram of an energy management system in accordance with embodiments of the present disclosure, in combination with an exemplary energy storage device.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

FIG. 1 is a simplified block diagram of an energy management system 100 in combination with an exemplary energy storage device 102, in accordance with embodiments of the present disclosure. The energy storage device 102 includes an energy storage medium 104 and an energy converter 105, which is configured to add energy to the medium 104. In some embodiments, the system 100 is an add-on system that is separate from the device 102, and generally includes a system controller 106 and one or more sensors, that are used to determine an energy storage capacity (e.g., charge level or remaining energy storage capacity) of the energy storage medium 104.

The energy storage device 102 may take on any suitable form to heat the storage medium 104, which may take the form of a liquid, a solid, a gas, or a phase-change material (e.g., a latent heat storage material). For example, the device 102 may be a water heater having water stored in a tank as the energy storage medium 104, a space heater having solid energy storage medium 104 (e.g., ceramic bricks, salt, sand), an air heater where the air (e.g., air in a room, house, etc.) operates as the energy storage medium 104, or another type of energy storage device 102, in which energy is used to heat the medium 104.

The energy converter 105 converts or uses energy 108 from an energy source 110 to add energy (e.g., heat) to the medium 104. The energy converter 105 may take on any suitable form depending on the type of energy 108 (e.g., electrical energy, heat energy, etc.) that is supplied by the energy source 110. For example, when the energy source 110 provides electrical energy 108, such as when the energy source 110 represents an electrical power distribution system (e.g., power grid), a wind turbine, photovoltaic cells, or other electrical energy source, the energy converter 105 may convert the electrical energy 108 from the energy source 110 into heat energy that is used to heat the medium 104. For example, the energy converter 105 may include: heating elements (e.g., resistive heating elements, heating coils, etc.) that convert the electrical energy 108 from the source 110 into heat energy; a heat pump that uses the electrical energy 108 from the source 110 to drive a compressor to compress a fluid (e.g., refrigerant) to generate heat that heats the medium 104; or another conventional electrical energy converter.

When the energy source 110 provides heat energy 108, such as in the form of a fluid flow to the converter 105, the energy converter 105 may take the form of a heat exchanger that transfers the heat energy from the fluid flow 108 to the medium 104. The cooled fluid may then be returned to the energy source 110 through a closed circuit, which is represented by heat energy or fluid flow 108'. For example, when the energy source 110 is in the form of heated water from solar panels, heat energy 108 contained in water heated using solar panels may be transferred by the heat exchanger form of the converter 105 to heat the medium 104, and the heated water 108' may then be returned to the energy source 110 for a new round of heating, in accordance with conventional techniques. Embodiments of the present disclosure may also operate using negative heat energy to cool the medium 104. Thus, the transfer of heat energy from the energy converter 105 to the medium 104 may include negative heat energy that cools the medium 104.

In some embodiments, the device 102 includes a device controller 111 and a temperature sensor 112. The temperature sensor 112 generates a temperature signal 114 indicating the temperature of the medium 104. The device controller 111 uses the temperature signal 114 to control the operation of the device 102 by activating the energy converter 105 when the temperature indicated by the signal 114 drops below a user-set temperature of the device 102.

As mentioned above, variable output power generators or energy sources 110 (wind power generators, solar power generators, etc.) often generate electrical or heat energy that exceeds the demand for the energy. One technique for utilizing the excess energy is to consume the energy using an energy storage appliance or device, such as the exemplary device 102, and storing the excess energy as heat in the energy storage medium 104. That is, excess electrical energy may be converted into heat energy by the converter 105 and transferred to the medium 104, or excess heat energy may be transferred to the medium 104 using the converter 105.

However, the mediums 104 have a limited charge level or energy storage capacity. The remaining energy storage capacity of the energy storage device 102, relates to the amount of energy storage the medium 104 has remaining from its current state or charge level. Thus, the remaining energy storage capacity of the medium 104 can be determined by subtracting a current energy storage level or charge level from the known maximum charge level or maximum amount of heat energy that may be stored by the medium 104. Accordingly, the terms "remaining energy storage capacity" and "charge level" are interchangeable.

For some applications, an estimation of the remaining energy storage capacity of the medium 104 may be useful in order to understand the amount of energy (e.g., excess energy) produced or delivered by the energy storage 110, that may be consumed by the medium 104. For example, when the electrical energy source 110 represents an electrical power distribution system, the remaining energy storage capacity of the device 102 may be useful when assisting in a load-following practice that is controlled by the electrical power distribution system, such as described in U.S. Pat. No. 10,186,879.

When the energy storage medium 104 is in the form of a heat storage medium 104, such as a volume of water contained in a tank of a water heater, or ceramic bricks of a space heater, one conventional technique for assessing the remaining energy storage capacity of the energy storage medium may be determined by the temperature of the energy storage medium 104. As discussed above, this temperature of the medium 104 is represented by the temperature signal 114, which may be obtained by the device controller 111, but may not be available or easily accessible to systems that are separate or external from the device 102.

Some embodiments of the system 100 and methods of the present disclosure operate to estimate the charge level of the energy storage medium 104 without a direct temperature measurement of the medium 104. That is, embodiments of the system 100 take the form of an add-on system that is separate or external to the device 102 and, therefore, the system 100 does not have direct access to the temperature signal 114 or a direct temperature measurement of the medium 104.

In some embodiments, the system 100 determines the energy storage capacity of the medium 104 in a non-intrusive manner. That is, embodiments of the present disclosure avoid significant modifications to the device 102 to allow the system 100 to access the temperature sensor 112 or the temperature signal 114, such as by tapping the temperature output signal 114 from the sensor 112 or modifying the device controller 111 of the device 102. Such modifications would be complicated by the need for distinct modifications depending on the type and model of the device 102. Furthermore, such modifications may violate manufacture's warranties for the device 102.

Accordingly, embodiments of the system 100 determine the energy storage capacity of the medium 104 substantially independently from the device 102, such as without having to use components of the device 102 (e.g., the temperature sensor 112 or controller 111), thereby avoiding the need to make significant modifications to the device 102. As a result, the system 100 may be installed without violating the manufacturer's warranty on the device 102. Furthermore, the system 100 may be installed in a substantially uniform manner for most types of the devices 102 and without significant knowledge of the inner workings of the devices 102. Thus, the installation of the system 100 is generally highly simplified relative to when access to components of the device 102 is necessary.

In some embodiments, the system controller 106 represents one or more processors that control components of the system 100 to perform one or more functions described herein in response to the execution of instructions, which may be stored locally in memory 116 of the system 100, or in memory that is remote from the system 100. The controller 106 is separate from the device 102 and its device controller 111. In some embodiments, the one or more processors of the controller 106 are components of one or more computer-based systems. In some embodiments, the controller 106 includes one or more control circuits, microprocessor-based engine control systems, one or more programmable hardware components, such as a field programmable gate array (FPGA), that are used to control components of the system 100 to perform one or more functions described herein.

The controller 106 estimates the charge level of the energy storage medium 104 based on an initial or previous charge level of the medium 104 and a change in the charge level of the medium 104 due to energy flows to and from the medium 104 over time. The controller 106 generally calculates a change in the charge level based on an energy flow from the medium 104 (heat energy output), and an energy flow to the medium 104 (heat energy input), such as a flow of heat from the converter 105 to the medium 104.

The controller 106 may calibrate or initialize the system 100 by calculating or estimating the initial charge level for the medium 104, which may be based on an actual or known volume and/or temperature of the medium 104. In some embodiments, actual or estimated device parameters 122 relating to the energy storage device 102 are stored in the memory 116, or are otherwise accessible by the controller 106 from a server, a web page, or other suitable location through a wired or wireless communication link. The parameters 122 may be stored in a look-up table based on an identification (e.g., model) of the energy storage device 102. In some embodiments, one or more of the parameters 122 may be directly input by a user or installer of the system 100. In some embodiments, one or more of the parameters 122 may be acquired through a communication with the device 102, such as through a wired or wireless communication link, such as Ethernet, CTA-2045, or another communication link or interface. Exemplary parameters 122 include a volumetric storage capacity for the medium 104, a set temperature for the medium 104 corresponding to a user-set temperature of the medium 104, a maximum temperature of the medium 104, power consumption of the energy converter 105 when activated, fluid flow conduit cross-sectional area for a heat energy flow 108, and/or other parameters.

In some embodiments, the energy input to the energy storage medium 104 from the converter 105 is determined or estimated using an energy input meter or sensor 118 (hereinafter "energy input sensor") that senses or measures the energy (or a parameter thereof) supplied to the device 102 (e.g., the energy converter 105) by the energy source 110. The energy input sensor 118 includes one or more energy input signals 120 that relate to the input energy.

As mentioned above, during operation, typical energy storage devices 102, such as water heaters, include the device controller 111 that receives the temperature signal 114 and deactivates the energy converter 105 when the energy storage medium 104 reaches its set temperature (e.g., user setting). In some embodiments, the system controller 106 determines or estimates that the temperature of the medium 104 has reached its set temperature upon detection that energy to the converter 105 from the energy source 110 has been deactivated based on the one or more signals 120 from the energy input sensor 118, which may include a suitable electrical power sensor, such as a voltmeter, an ammeter, a current transformer, or another suitable electrical power sensor, for example. The system controller 106 can then determine or estimate the initial charge level of the medium 104 based on the actual or estimated volumetric storage capacity for the medium 104 (e.g., capacity of the tank 107), and the actual or estimated set temperature for the medium 104.

In some embodiments, the controller 106 estimates an amount of energy delivered to the energy converter 105 based on the one or more energy input signals 120 from the energy sensor 118. The controller 106 can use the estimated or measured energy delivered to the energy converter 105 to estimate the heat energy that is transferred or input (e.g., heat energy input) to the medium 104. For example, when the energy source 110 supplies an energy flow 108 in the form of electrical power, such as from an electrical grid (e.g., landline power), a wind turbine, photovoltaic cells, etc., the energy sensor 118 is configured to measure at least one electrical parameter of the energy flow 108, and the signal 120 indicates the electrical power of the energy flow 108. Thus, the sensor 118 may include an ammeter (e.g., current transformer or shunt) or a voltmeter, and the signal 120 may indicate a current level (amperes) of the energy flow 108, a voltage level of the energy flow 108, or a power level (watts) of the energy flow 108. The detected or estimated electrical power supplied to the converter 105 over time may be used by the controller 106 in estimating the heat energy input to the medium 104 from the converter 105.

Alternatively, the signal 120 may indicate whether electrical power 108 is being delivered to the converter 105. Thus, the energy sensor 118 may include an electrical power sensor comprising a voltmeter, an ammeter, a current transformer or another suitable detector for detecting the electrical energy flow 108 to the device 102 and/or the converter 105. Here, the rate of heat energy input to the medium 104 by the energy converter 105 may be a known parameter of the device 102, which may be stored as a parameter 122 in the memory 116. Thus, the controller 106 can estimate the heat energy input to the medium 104 by the converter 105 based on the period of time that electrical energy is being supplied to the converter 105 from the source 110. Accordingly, in some embodiments, the controller 106 uses the energy input sensor 118 to detect the period of time when electrical power to the converter 105 and estimate the heat energy input to the medium 104 based on the detected period of time.

When the energy flow 108 supplied to the converter 105 from the energy source 110 is in the form of heat energy in a fluid flow, such as from flow of heated water from a solar panel array, the input energy sensor 118 may represent one or more temperature sensors and/or flow sensors. In one embodiment, the input energy sensor 118 represents a temperature sensor that detects the temperature of the fluid flow 108 delivered to the energy converter 105 and indicates the detected temperature by generating one of the signals 120, and a flow sensor that detects a flow rate of the fluid flow 108 delivered to the energy converter 105 and indicates the detected flow rate by generating one of the signals 120. The detected flow rate indicated by the signal 120 may be used by the controller 106 to determine a volumetric flow rate of the fluid flow 108 being delivered to the energy converter 105 based on parameters 122 of the device 102, such as the cross-sectional area of conduit supplying the fluid flow 108. This information may be used to estimate a volumetric heat flow to the converter 105, from which the heat energy input to the medium 104 may be estimated by the controller 106. If the flow rate of the fluid flow 108 is a known parameter 122 of the device 102, the flow sensor may be eliminated.

In some embodiments, a second energy input sensor 118' comprising a temperature sensor may be used to provide a signal 120' to the controller 106 that is indicative of the temperature of the return fluid flow 108'. This temperature of the return fluid flow 108' may be used by the controller 106 to determine the volumetric heat energy of the output fluid 108', such as by assuming that the volumetric flow rate of the fluid flow 108' is the same as that of the fluid flow 108. Thus, the signals 120 and 120' may be used by the controller 106 to determine a net heat energy input to the device 102, such as the converter 105. This net heat energy input may be used by the controller 106 to estimate the heat energy input to the medium 104.

The heat energy output from the medium 104 may be estimated by the controller 106 using an energy output sensor 123. For energy storage mediums 104 that involve a fluid flow 124, such as a flow of water (e.g., the medium 104) into and out of a tank 107 of a water heater type of device 102, or a flow of air into and out of an air heating type of device 102, the use or heat energy output by the energy storage medium 104 corresponds to the temperature and volume of the fluid flow 124. In some embodiments, the output energy sensor 123 includes a temperature sensor 136 having a temperature signal indicating the temperature of the fluid flow 124 discharged from the medium 104, and a temperature sensor 140 having a temperature signal 142 indicating the temperature of the fluid flow that is returned to the medium (e.g., cool water or air). When the volumetric flow rate of the fluid flow 124 is known and stored as a parameter 122, the system controller 106 can use the temperatures indicated by the signal 140 or the signals 140 and 142 to estimate the energy flow from the energy storage medium 104.

If the volumetric flow rate of the fluid flow 124 is not known, the energy output sensor 123 may include a flow sensor 125 that is configured to measure a flow rate of the fluid flow 124 discharged from the device 102, and generate an output signal 126 that is indicative of the flow rate. In some embodiments, the controller 106 uses the cross-sectional area of the conduit 128 at the location of the sensor 125, which may be one of the stored parameters 122, to calculate the volumetric flow rate of the fluid flow 124 based on the flow sensor output 126. The flow sensor 125 may take on any suitable form, such as an ultrasonic flow sensor mounted to the exterior of the conduit 128, through which the flow of the medium 104 travels, or a turbine flow sensor, for example. While the flow sensor 125 is illustrated as being at an outlet where the fluid flow 124 is discharged (e.g., outlet 130 of the tank 107), it is understood that the flow sensor 125 may alternatively be located where the fluid flow 124 or a different fluid flow is returned to the medium 104, such as through an input 132 of the tank 107. When the fluid flow discharged from the medium is expected to be different from the fluid flow that is returned to the medium 104, separate fluid flow sensors 125 may be used at each location.

Exemplary calculations that may be performed by the controller 106 to estimate the charge level of the energy storage medium 104 or a change in the charge level of the energy storage medium 104 are provided below. In the examples, the energy storage medium 104 is in the form of water contained in a tank 107 of a water heater device 102.

The energy (Q) stored in the medium 104 can be calculated based on the heat capacity (C) of the medium 104 using the following equations.

$$Q = C \cdot \Delta T$$

This can be reduced using the specific heat capacity (c) of the storage medium 104 as follows:

$$C = m \cdot c = \rho \cdot V \cdot c \text{ and } \Delta T = (T_{hot} - T\text{ref})$$

$$Q = \rho \cdot V \cdot c \cdot (T - T\text{ref})$$

The volume (V) of the medium 104 contained in the device 102 may be one of the parameters 122. Thus, the volume V may be entered by the controller 106 and the remaining terms may be reduced to a constant (r).

$$Q = (\rho \cdot c \cdot (T - T\text{ref})) \cdot V = r \cdot V$$

The temperature change of the stored medium 104 in the device 102 from the discharge of the heated medium 104 (e.g., water in the tank 107) and its replenishment through the input 132 may be estimated based on the actual or estimated temperature of the replenishing volume of the medium 104 and the actual or estimated temperature of the medium 104 before receiving the replenishing volume.

The constant r can be further calibrated by comparing the input energy to the converter 105 (detected using the sensor 108) over time to the volumetric outflow of heated medium 104 to derive a learned relationship between outflow of the heated medium 104 and the energy input to the converter 105. This can help to accommodate sources of error such as static heat dissipation through insulating material of the device 102, heating element variability, and variable inlet and outlet temperatures. Alternately, these types of known sources of heat loss may be accounted for directly by adding them into the algorithm. For example, static heat loss from the medium 104 may be calculated by converting the current energy storage or charge level back to a temperature of the medium 104 using the same calculations and then using the temperature of the medium 104 relative to the expected or measured ambient temperature to determine a heat loss over time.

Additional exemplary embodiments will be discussed below for a water heater type of energy storage device 102 that uses the electrical power grid as the energy source 110 using the variables listed in the following table. However, it is understood that the embodiments also apply to different types of energy storage devices 102 and energy sources 110, such as those described above.

| VARIABLE | DESCRIPTION |
|---|---|
| $\Delta E$ | Amount of electrical energy input to the medium 104 by the converter, which is estimated by the energy sensor 118 in W·h |
| $\Delta Q$ | Volume of water measured by the flow sensor 125 in US gal |
| $E_{MAX}$ | Maximum energy storage of the water heater in W·h |
| $E_{OUT}$ | Energy consumed by the system for customer benefit in W·h |
| $E_{STORED}$ | Current energy storage level of the water heater in US gal |
| r | Ratio of the energy content of water to its volume in W·h/US gal |
| V | Rated volume of the water heater in US gal |

At startup of the system 100, the constant r is calculated or retrieved by the controller 106 as one of the parameters 122. For this example, we use r=138, which is the amount of energy required to raise 0.95 US gal of water 60° F. The volume of 0.95 includes a 5% derate of rated volume. This example also assumes a 60° F. temperature rise from a 60° F. reference temperature to a 120° F. set point temperature. These may be starting assumptions when no better data is available.

As mentioned above, the controller 106 looks for a deactivation of energy to the converter 105 using the input energy sensor 118 to detect when the temperature of the water medium 104 reaches the set temperature for the device 102 and the maximum energy storage capacity or charge level for the medium 104. Thus, the following values may be determined using the controller 106.

| | |
|---|---|
| r = $\Delta E/\Delta Q$ | Assume that accumulated energy input is equal to accumulated energy output and recalculate the energy ratio. This only calculates if sufficient water output has been detected. |
| $E_{MAX} = r \cdot V$ | Calculate maximum energy storage |
| $E_{STORED} = E_{MAX}$ | Assume that unit is at maximum energy storage |

In some embodiments, the controller 106 monitors the change in the energy level of the medium 104 over predefined time increments. In some embodiments, the time increments are each set to 30 seconds, 1 minute, 5 minutes, 10 minutes, 15 minutes, and/or another suitable time increment. At the transition of each time increment, the controller 106 evaluates the following parameters.

$$E_{OUT} = r \cdot \Delta Q$$

In some embodiments, this equation may be modified to include an estimation of energy loss from static dissipation, as indicated below.

$$E_{OUT} = r \cdot \Delta Q + r \cdot E_{STORED}/E_{MAX}$$

The initial charge level of the medium 104 ($E_{STORED}$) may then be calculated as follows:

$$E_{STORED} = E_{MAX} - E_{OUT} + \Delta E$$

In some embodiments, after a critical number of time intervals have elapsed, energy drift may become a concern. This may be counteracted by requiring the device 102 to heat the storage medium 104 using the converter 105 until the medium 104 reaches the set temperature and charging is interrupted by the heater thermostat of the device 102.

The following is an example of the system 100 in operation.

| STEP | DESCRIPTION | PARAMETER VALUES |
|---|---|---|
| 0 | Startup | r = 138, $E_{MAX}$ = 11040 (V = 80 US gal), $E_{STORED}$ = 11040 |
| 1 | Increment 1 (shower) | $\Delta Q$ = 16, $\Delta E$ = 1000, $E_{OUT}$ = 2208, $E_{STORED}$ = 9832 |
| 2 | Increment 2 | $\Delta Q$ = 18 (+2), $\Delta E$ = 2000 (+1000), $E_{OUT}$ = 2484, $E_{STORED}$ = 10556 |
| 3 | Critical Increment | $\Delta Q$ = 19 (+1), $\Delta E$ = 3000 (+1000), $E_{OUT}$ = 2622, $E_{STORED}$ = 11418 |
| 4 | Charging Interrupted | r = 158, $E_{MAX}$ = 12640, $E_{STORED}$ = 12640 |
| 5 | Increment 1 | $\Delta Q$ = 3, $\Delta E$ = 300, $E_{OUT}$ = 474, $E_{STORED}$ = 12466 |

At startup, the charge level of the medium 104 is determined when the medium 104 is at the set temperature for the device 102. Here, the constant r for water is estimated as 138. Thus, for an 80 gallon tank 107, the charge level of the medium 104 is at its max of 11,040 W·h. During a first time period increment, a shower is turned on and the volume of water output ($\Delta Q$) from the tank 107 is determined to be 16 gallons by the controller 106 using the flow sensor 125. This volume is multiplied by the constant r to determine that 2,208 W·h ($E_{OUT}$) were discharged from the medium 104 during the time increment. Also, during this first time period increment, the energy source 110 provided energy to the converter 105, which was sensed by the input energy sensor 118 and reported to the controller 106 using the output 120. This sensed energy input to the device 102 indicates that 1000 W·h of energy ($\Delta E$) was added to the medium. The value of $E_{OUT}$ is subtracted from the previously calculated charge level of the medium 104 and the value of $\Delta E$ is added, resulting in a final charge level at the expiration of the first time period increment of 9832 W·h of energy.

An additional draw of water from the tank occurs during the second time period increment, resulting in an additional 2 gallons of water (for a total of 18 gallons) being output from the tank 107, as measured using the flow sensor 125. This results in 276 W·h (a total of 2484 W·h) ($E_{OUT}$) being discharged, while another 1000 W·h (a total of 2000 W·h) ($\Delta E$) of energy was added to the medium 104 by the energy converter 105. This results in a final charge level at the expiration of the second time period increment of 10556 W·h of energy.

Another draw of water occurs during the third time period increment, resulting in an additional 1 gallon of water (now a total of 19 gallons) being output from the tank 107, as measured using the flow sensor 125. This results in 138 W·h (a total of 2622 W·h) ($E_{OUT}$) being discharged, while another 1000 W·h (a total of 3000 W·h) ($\Delta E$) of energy was added to the medium 104 by the energy converter 105. This results in a calculated final charge level at the expiration of the second time period increment of 11418 W·h of energy.

The controller 106 detects the interruption of the heating of the medium 104 using the energy sensor 118, and the constant r is reevaluated by the controller as new $r_{new}$=new $E_{MAX}$/old $E_{MAX}*r_{old}$=12640/11040*138=158.

This results in $E_{MAX}=E_{STORED}$=12640 W·h. A new time period increment may then begin.

As mentioned above, the controller 106 may use a measurement by the energy sensor 118 of the time energy is supplied to the device 102 or the converter 105 to determine the energy input to the medium 104. In some embodiments, $E_{OUT}$ determined by the controller 106 may also be in units of time that the converter 105 must be activated to accommodate for the energy loss. Other variations may also be implemented.

The basic energy calculation performed using the controller 106 may be enhanced in various ways. In one example, static heat dissipation may be considered, as mentioned above using the equation provided below.

$$E_{OUT}=r(\Delta Q+h \cdot E_{STORED}/E_{MAX})$$

Where h is a constant for the device 102. While this example provides a linearly-varying compensation for energy loss due to static heat dissipation, it is understood that a nonlinear compensation factor may also be used to compensate for other effects.

In some embodiments, the system 100 includes a temperature sensor 136 having a temperature signal 138 at the outlet 130 that is used to estimate the temperature of the discharged medium 104 and, thus, the set temperature for the medium 104. The temperature output from the sensor 136 can improve the energy approximation made by the controller 106. Thus, rather than assuming a temperature delta of 60° F. from the set temperature, as in the example provided above, the controller 106 can use the temperature signal 138 to measure the top end ($T_{hot}$) of $\Delta T$ resulting in a greater level of accuracy in the ratio calculation. This also allows the system 100 to automatically adjust for a user-adjustment of the water heater thermostat. Thus, the constant r may be recalculated as follows.

$$r=2.3 \cdot (T_{hot}-60)$$

The temperature sensor 136 may take on any suitable form. In some embodiments, the temperature sensor 136 may estimate the temperature of the discharged medium 104 based on a temperature of the conduit 128, or the sensor 136 may include a temperature probe that is introduced into the conduit 128. When the temperature sensor is not placed within the conduit 128, but estimates $T_{hot}$ based on a surface temperature of the conduit 128, the controller 106 may set $T_{hot}$ to a maximum reading from the sensor 136, or the controller 106 may evaluate the temperature signal 138 only after a critical duration of water flow has occurred through the outlet 130.

The calculation of the charge or energy level of the medium may also be enhanced using a temperature sensor 140 having an output 142 that indicates the temperature of the cold water ($T_{cold}$) being input to the tank 107 through the inlet 132. This will give the system 100 a better understanding of the temperature rise driven by the energy converter 105. Additionally, the temperature measurement provided by the sensor 140 helps to compensate for seasonal and regional differences in input water temperature. This provides a similar benefit to determining the constant r as the hot water temperature sensor 136. Thus, we can evaluate r using the temperature indicated by the temperature signal 142 as follows.

$$r=2.3 \cdot (120-T_{cold})$$

Where the set temperature ($T_{hot}$) parameter is set to 120° F. The temperature sensor 140 may be of the same type as that of the sensor 136. Additionally, the signal 142 may be evaluated by the controller 106 as discussed above for the signal 138.

If both of the temperature sensors 136 and 140 are used, the constant r may be determined by the temperatures indicated by the output signals 138 ($T_{hot}$) and 142 ($T_{cold}$), as indicated in the following equation.

$$r=2.3 \cdot (T_{hot}-T_{cold})$$

In some embodiments, a differential temperature measurement of the medium flow at the input 132 and at the output 130 is made using one or more sensors, such as the temperature sensors 140 and 136. Thus, the output received by the controller would be the differential temperature or $T_{hot}-T_{cold}$.

In some embodiments, the system 100 may include an ambient temperature sensor 144 that produces an ambient temperature signal 146 to the controller 106 that indicates an ambient temperature ($T_{amb}$) of the environment in which the device 102 resides. The sensed ambient temperature 146 can assist the system 100 in tuning the static heat dissipation compensation by providing the current environmental temperature. This could be important for applications where the water heater is in an uncontrolled environment, such as a garage, or in a climate with significant seasonal variations in temperature, for example. Accordingly, the energy loss ($E_{Dis}$) from the medium 104 from heat dissipation may be estimated as indicated in the following equation.

$$E_{Dis}=h \cdot (E_{STORED}-j \cdot T_{amb})$$

Where h and j are constants for the device 102. When the hot temperature sensor 136 is used, this equation can be modified as indicated below.

$$E_{Dis}=h \cdot (T_{hot}-T_{amb})$$

Thus, the system 100 may be used to evaluate a stored energy or charge level of the medium 104 of an energy storage device 102 and, thus, a remaining energy storage or charge level capacity of the medium 104. The determined charge level may be used to facilitate control of the energy storage device 102 in a system that uses the device 102 to control an electrical load, such as described in the applications and patents referenced above.

The ambient temperature sensor 144 may also be used to estimate the coefficient of performance of a heat pump version of the energy converter 105. This can allow the controller 106 to accommodate for a varying coefficient of performance of the heat pump between the energy supplied to the heat pump by the energy source 110 and the heat generated by the heat pump for heating the medium 104. This would be particularly helpful when the heat pump is in an uncontrolled environment.

While embodiments of the present disclosure described above operate to heat the medium 104, it is understood that embodiments of the present disclosure may also be used by energy converters 105 that cool the medium 104. For example, a heat pump form of energy converter may be operated in a refrigeration cycle to cool the medium 104. Thus, embodiments of the present disclosure generally involve an energy consuming converter 105 that drives a heat transfer (heating or cooling) with the energy storage medium to store heat energy in the form of a temperature differential (i.e., hotter or colder) from a reference (e.g., ambient temperature).

Additionally, embodiments of the present disclosure may be used in systems having potential energy storage devices in place of the energy storage medium 104, where the energy converter 105 drives a mass of material to a higher elevation using energy from the energy source 110, for example.

Specific details are given in the above-description to provide a thorough understanding of the embodiments. However, it is understood by those of ordinary skill in the art that the embodiments may be practiced without these specific details. For example, circuits, systems, networks, processes, frames, supports, connectors, motors, processors, and other conventional components may not be shown, or shown in block diagram form in order to not obscure the embodiments in unnecessary detail.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

It will be understood that, although the terms first, second, etc. may be used herein to describe various elements, these elements should not be limited by these terms. These terms are only used to distinguish one element from another. Thus, a first element could be termed a second element without departing from the teachings of the present disclosure.

Unless otherwise defined, all terms (including technical and scientific terms) used herein have the same meaning as commonly understood by one of ordinary skill in the art relating to the present disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, embodiments of the present disclosure may be embodied as methods, systems, devices, and/or computer program products, for example. Accordingly, embodiments of the present disclosure may take the form of an entirely hardware embodiment, an entirely software embodiment or an embodiment combining software and hardware aspects. The computer program or software aspect of embodiments of the present disclosure may comprise computer readable instructions or code stored in a computer readable medium or memory. Execution of the program instructions by one or more processors (e.g., central processing unit) results in the one or more processors performing one or more functions or method steps described herein. Any suitable patent subject matter eligible computer readable media or memory may be utilized including, for example, hard disks, CD-ROMs, optical storage devices, or magnetic storage devices. Such computer readable media or memory do not include transitory waves or signals.

Computer program or software aspects of embodiments of the present disclosure may comprise computer readable instructions or code stored in a computer readable medium or memory. Execution of the program instructions by one or more processors (e.g., central processing unit or controller) results in the one or more processors performing one or more functions or method steps or functions described herein. Any suitable patent subject matter eligible computer readable media or memory may be utilized including, for example, hard disks, CD-ROMs, optical storage devices, or magnetic storage devices. Such computer readable media or memory do not include transitory waves or signals.

Although the embodiments of the present disclosure have been described with reference to preferred embodiments, workers skilled in the art will recognize that changes may be made in form and detail without departing from the spirit and scope of the present disclosure. Each of the applications and patents referenced above are hereby incorporated herein by reference in their entirety.

What is claimed is:

1. An energy management system for an energy storage device, which includes an energy storage medium, an energy converter configured to add heat energy to the medium using electrical power, a device temperature sensor configured to detect a temperature of the energy storage medium, and a device controller configured to control the energy converter based on a temperature signal from the device temperature sensor, the system comprising:
    an energy input sensor configured to sense an electrical parameter of the electrical power and generate an energy input signal indicating a heat energy flow to the energy storage medium;
    an energy output sensor configured to generate at least one energy output signal indicating a heat energy flow from the energy storage medium; and
    a system controller configured to estimate a charge level of the energy storage medium based on an initial charge level of the energy storage medium and a change in the charge level of the energy storage medium, which is based on the energy input signal and the at least one energy output signal over a period of time, wherein:
the charge level relates to an amount of heat energy that is either stored in the energy storage medium or that may be further stored in the energy storage medium; and
the energy storage medium is selected from the group consisting of water, ceramic bricks, salt, sand, and air.

2. The system of claim 1, wherein:
the system comprises memory containing one or more parameters relating to the energy storage device including a set temperature for the energy storage medium; and
the system controller estimates the initial charge level of the energy storage medium based on the energy input signal and the set temperature.

3. The system of claim 1, wherein the energy converter comprises heating elements that convert the electrical power into heat energy for heating the energy storage medium, or a heat pump that uses the electrical energy to drive a compressor to compress a fluid to generate heat energy for heating the energy storage medium.

4. The system of claim 1, wherein the energy storage medium comprises water contained in a tank.

5. The system of claim 1, wherein the energy storage medium is selected from the group consisting of ceramic bricks, salt, and sand.

6. The system of claim 1, wherein the energy storage medium comprises air.

7. The system of claim 1, wherein:
the energy input signal indicates whether electrical power is delivered to the energy converter;
the system comprises memory containing one or more parameters relating to the energy storage device including a rate of power consumption by the energy converter; and
the system controller estimates the change in the charge level of the energy storage medium based on the rate of power consumption and the energy input signal.

8. An energy management system for an energy storage device, which includes an energy storage medium, an energy converter configured to add heat energy to the medium, a device temperature sensor configured to detect a temperature of the energy storage medium, and a device controller configured to control the energy converter based on a temperature signal from the device temperature sensor, the system comprising:
an energy input sensor configured to generate at least one energy input signal indicating a heat energy flow to the energy storage medium;
an energy output sensor configured to generate at least one energy output signal indicating a heat energy flow from the energy storage medium; and
a system controller configured to estimate a charge level of the energy storage medium based on an initial charge level of the energy storage medium and a change in the charge level of the energy storage medium, which is based on the at least one energy input signal and the at least one energy output signal over a period of time,
wherein:
the charge level relates to an amount of heat energy that is either stored in the energy storage medium or that may be further stored in the energy storage medium;
the energy storage medium is selected from the group consisting of water, ceramic bricks, salt, sand, and air;
the energy converter includes a heat exchanger;
the heat energy flow to the energy storage medium includes an exchange of heat energy between a fluid flow and the energy storage medium using the heat exchanger;
the at least one energy input signal indicates at least one parameter of the fluid flow; and
wherein the fluid flow is contained in a closed circuit.

9. The system of claim 8, wherein the energy input sensor comprises a first temperature sensor, and the at least one energy input signal is based on a first temperature signal from the first temperature sensor indicating a temperature of the fluid flow before the exchange of heat energy.

10. The system of claim 9, wherein the energy input sensor comprises a flow rate sensor configured to detect a flow rate of the fluid flow, and the at least one energy input signal is based on a fluid flow signal from the flow rate sensor indicating a flow rate of the fluid flow.

11. The system of claim 10, wherein the energy input sensor comprises a second temperature sensor, and the at least one energy input signal is based on a second temperature signal from the second temperature sensor indicating a temperature of the fluid flow after the exchange of heat energy.

12. The energy management system of claim 8, wherein the energy storage medium is selected from the group consisting of ceramic bricks, salt, sand, and air.

13. A method of managing energy for an energy storage device, which includes an energy storage medium, an energy converter configured to add heat energy to the medium, a device temperature sensor configured to detect a temperature of the energy storage medium, and a device controller configured to control the energy converter based on a temperature signal from the device temperature sensor, the method comprising:
generating at least one energy input signal using an energy input sensor indicating heat energy input to the energy storage medium from the energy converter;
generating at least one energy output signal using an energy output sensor indicating heat energy output from the energy storage medium; and
estimating a charge level of the energy storage medium based on an initial charge level of the energy storage medium and a change in the charge level of the energy storage medium, which is based on the at least one energy input signal and the at least one energy output signal over a period of time, using a system controller,
wherein:
the charge level relates to an amount of heat energy that is either stored in the energy storage medium or that may be further stored in the energy storage medium;
the energy storage medium is selected from the group consisting of water, ceramic bricks, salt, sand, and air;
the at least one energy input signal indicates one of electrical power delivered to the energy converter and an exchange of heat energy between a fluid flow and the energy storage medium using a heat exchanger of the energy converter; and
the fluid flow is contained in a closed circuit.

14. The method of claim 13, further comprising:
obtaining a set temperature for the energy storage medium from a memory using the system controller; and
estimating the initial charge level of the energy storage medium based on the energy input signal and the set temperature.

15. The method of claim 13, wherein:
the energy converter is configured to heat the energy storage medium using the electrical power; and
the energy input sensor comprises an energy sensor configured to sense an electrical parameter of the electrical power and generate the at least one energy input signal, which is indicative of the sensed electrical parameter.

16. The method of claim 15, wherein:
the at least one energy input signal indicates whether electrical power is delivered to the energy converter;
the system comprises memory containing one or more parameters relating to the energy storage device including a rate of power consumption by the energy converter; and
the system controller estimates the change in the charge level of the energy storage medium based on the rate of power consumption and the at least one energy input signal.

17. The method of claim 16, wherein the energy storage medium is selected from the group consisting of ceramic bricks, salt, sand, and air.

18. The method of claim 13, wherein the at least one energy input signal indicates the exchange of heat energy between the fluid flow and the energy storage medium using the heat exchanger.

19. The method of claim 18, wherein the energy storage medium is selected from the group consisting of ceramic bricks, salt, sand, and air.

* * * * *